(12) United States Patent
Wessling (10) Patent No.: US 8,620,967 B2
(45) Date of Patent: Dec. 31, 2013

(54) MANAGING METADATA FOR OCCURRENCES OF A RECORDING

(75) Inventor: Jens Nicholas Wessling, Ann Arbor, MI (US)

(73) Assignee: Rovi Technologies Corporation, Santa Clara, CA (US)

( * ) Notice: Subject to any disclaimer, the term of this patent is extended or adjusted under 35 U.S.C. 154(b) by 127 days.

(21) Appl. No.: 12/456,177

(22) Filed: Jun. 11, 2009

(65) Prior Publication Data

US 2010/0318586 A1 Dec. 16, 2010

(51) Int. Cl.
*G06F 17/30* (2006.01)

(52) U.S. Cl.
USPC .......................................................... 707/803

(58) Field of Classification Search
USPC .................. 707/737, 803; 369/47.1
See application file for complete search history.

(56) References Cited

U.S. PATENT DOCUMENTS

| | | |
|---|---|---|
| 3,663,885 A | 5/1972 | Stewart |
| 4,677,466 A | 6/1987 | Lert, Jr. et al. |
| 4,843,562 A | 6/1989 | Kenyon et al. |
| 5,210,820 A | 5/1993 | Kenyon |
| 5,432,852 A | 7/1995 | Leighton et al. |
| 5,437,050 A | 7/1995 | Lamb et al. |
| 5,473,759 A | 12/1995 | Slaney et al. |
| 5,612,729 A | 3/1997 | Ellis et al. |
| 5,647,058 A | 7/1997 | Agrawal et al. |
| 5,825,830 A | 10/1998 | Kopf |
| 5,862,260 A | 1/1999 | Rhoads |
| 5,918,223 A | 6/1999 | Blum et al. |
| 5,960,388 A | 9/1999 | Nishiguchi et al. |
| 5,987,525 A | 11/1999 | Roberts et al. |
| 6,061,680 A | 5/2000 | Scherf et al. |
| 6,154,773 A | 11/2000 | Roberts et al. |
| 6,161,132 A | 12/2000 | Roberts et al. |
| 6,201,176 B1 | 3/2001 | Yourlo |
| 6,230,192 B1 | 5/2001 | Roberts et al. |
| 6,230,207 B1 | 5/2001 | Roberts et al. |
| 6,240,459 B1 | 5/2001 | Roberts et al. |
| 6,252,831 B1 | 6/2001 | Wehmeyer |
| 6,304,523 B1 | 10/2001 | Jones et al. |
| 6,321,200 B1 | 11/2001 | Casey |

(Continued)

FOREIGN PATENT DOCUMENTS

| | | |
|---|---|---|
| DE | 10 2007 030 131 B3 | 10/2008 |
| WO | 9930488 A1 | 6/1999 |

(Continued)

OTHER PUBLICATIONS

International Search Report for International application No. PCT/US2010/036148 mailed Aug. 3, 2010, 2 pages.

(Continued)

*Primary Examiner* — Cam-Linh Nguyen
(74) *Attorney, Agent, or Firm* — Inventive Patent Law P.C.; Jim H. Salter (57) ABSTRACT

A method and a system are provided for managing metadata for occurrences of a recording. In one example, the system receives a recording. The recording includes computer readable media data. The system generates an internal identifier of the recording. The internal identifier is a signature that uniquely identifies the recording. The system then adds the internal identifier to metadata that are associated with at least one occurrence of the recording. The metadata are data that describe the recording.

19 Claims, 8 Drawing Sheets

(56) References Cited

U.S. PATENT DOCUMENTS

| | | | |
|---|---|---|---|
| 6,330,593 B1 | 12/2001 | Roberts et al. | |
| 6,434,520 B1 | 8/2002 | Kanevsky et al. | |
| 6,453,252 B1 | 9/2002 | Laroche | |
| 6,463,433 B1 | 10/2002 | Baclawski | |
| 6,505,160 B1 | 1/2003 | Levy et al. | |
| 6,512,796 B1 | 1/2003 | Sherwood | |
| 6,539,395 B1 | 3/2003 | Gjerdingen et al. | |
| 6,570,991 B1 | 5/2003 | Scheirer et al. | |
| 6,571,144 B1 | 5/2003 | Moses et al. | |
| 6,574,594 B2 | 6/2003 | Pitman et al. | |
| 6,604,072 B2 | 8/2003 | Pitman et al. | |
| 6,657,117 B2 | 12/2003 | Weare et al. | |
| 6,675,174 B1 | 1/2004 | Bolle et al. | |
| 6,826,350 B1 | 11/2004 | Kashino et al. | |
| 6,829,368 B2 | 12/2004 | Meyer et al. | |
| 6,963,975 B1 | 11/2005 | Weare | |
| 7,080,253 B2 * | 7/2006 | Weare | 713/176 |
| 7,136,866 B2 | 11/2006 | Springer, Jr. et al. | |
| 7,191,190 B2 | 3/2007 | Debique et al. | |
| 7,277,766 B1 | 10/2007 | Khan et al. | |
| 7,289,717 B1 * | 10/2007 | McGrath et al. | 386/281 |
| 7,359,900 B2 | 4/2008 | Bogdanov | |
| 7,383,228 B2 * | 6/2008 | Lisanke et al. | 705/51 |
| 7,451,078 B2 | 11/2008 | Bogdanov | |
| 7,457,532 B2 | 11/2008 | Barde et al. | |
| 7,549,061 B2 | 6/2009 | Nonaka et al. | |
| 7,707,221 B1 * | 4/2010 | Dunning et al. | 707/770 |
| 7,711,564 B2 * | 5/2010 | Levy et al. | 704/270 |
| 7,792,865 B2 * | 9/2010 | Hamada et al. | 707/796 |
| 7,881,656 B2 * | 2/2011 | Khedouri et al. | 455/3.01 |
| 7,962,413 B2 * | 6/2011 | Lisanke et al. | 705/50 |
| 7,962,750 B1 * | 6/2011 | Gruse et al. | 713/171 |
| 7,966,016 B2 | 6/2011 | Moritomo | |
| 8,055,899 B2 * | 11/2011 | Levy et al. | 713/176 |
| 2002/0023020 A1 | 2/2002 | Kenyon et al. | |
| 2002/0028000 A1 | 3/2002 | Conwell et al. | |
| 2002/0055920 A1 | 5/2002 | Fanning et al. | |
| 2002/0087565 A1 | 7/2002 | Hoekman et al. | |
| 2002/0101989 A1 | 8/2002 | Markandey et al. | |
| 2002/0133499 A1 | 9/2002 | Ward et al. | |
| 2003/0018709 A1 | 1/2003 | Schrempp et al. | |
| 2003/0028796 A1 | 2/2003 | Roberts et al. | |
| 2003/0033321 A1 | 2/2003 | Schrempp et al. | |
| 2003/0046283 A1 | 3/2003 | Roberts | |
| 2003/0086341 A1 | 5/2003 | Wells et al. | |
| 2003/0101162 A1 | 5/2003 | Thompson et al. | |
| 2003/0112729 A1 | 6/2003 | Nichols et al. | |
| 2003/0135513 A1 | 7/2003 | Quinn et al. | |
| 2003/0174861 A1 | 9/2003 | Levy et al. | |
| 2003/0191764 A1 | 10/2003 | Richards | |
| 2004/0028281 A1 | 2/2004 | Cheng et al. | |
| 2004/0034441 A1 | 2/2004 | Eaton et al. | |
| 2004/0074378 A1 | 4/2004 | Allamanche et al. | |
| 2004/0143349 A1 | 7/2004 | Roberts et al. | |
| 2004/0172411 A1 | 9/2004 | Herre et al. | |
| 2004/0260682 A1 * | 12/2004 | Herley et al. | 707/3 |
| 2004/0267522 A1 | 12/2004 | Allamanche et al. | |
| 2005/0017879 A1 | 1/2005 | Linzmeier et al. | |
| 2005/0065976 A1 | 3/2005 | Holm et al. | |
| 2005/0141707 A1 | 6/2005 | Haitsma et al. | |
| 2005/0197724 A1 | 9/2005 | Neogi | |
| 2005/0289139 A1 | 12/2005 | Takashima et al. | |
| 2006/0122839 A1 | 6/2006 | Li-Chun Wang et al. | |
| 2006/0149533 A1 | 7/2006 | Bogdanov | |
| 2006/0190450 A1 | 8/2006 | Holm et al. | |
| 2006/0229878 A1 | 10/2006 | Scheirer | |
| 2006/0242198 A1 | 10/2006 | Jaffray et al. | |
| 2007/0061584 A1 | 3/2007 | Takashima et al. | |
| 2007/0112844 A1 * | 5/2007 | Tribble et al. | 707/102 |
| 2007/0136282 A1 | 6/2007 | Takashima | |
| 2007/0247985 A1 | 10/2007 | Ueda et al. | |
| 2007/0283078 A1 | 12/2007 | Li et al. | |
| 2007/0288478 A1 | 12/2007 | DiMaria et al. | |
| 2008/0016576 A1 | 1/2008 | Ueda et al. | |
| 2008/0045236 A1 * | 2/2008 | Nahon et al. | 455/456.1 |
| 2008/0049113 A1 | 2/2008 | Hirai | |
| 2008/0134340 A1 | 6/2008 | Ueda et al. | |
| 2008/0140433 A1 * | 6/2008 | Levy et al. | 705/1 |
| 2008/0250100 A1 | 10/2008 | Hatanaka et al. | |
| 2009/0041248 A1 | 2/2009 | Hatae et al. | |
| 2009/0259690 A1 | 10/2009 | Bogdanov | |
| 2009/0269042 A1 | 10/2009 | Takashima et al. | |
| 2010/0033624 A1 | 2/2010 | Smith et al. | |
| 2010/0128936 A1 | 5/2010 | Baughman | |
| 2010/0228704 A1 | 9/2010 | Kahlbaum et al. | |
| 2010/0228736 A1 | 9/2010 | Kahlbaum et al. | |
| 2010/0318493 A1 | 12/2010 | Wessling | |
| 2011/0047165 A1 | 2/2011 | Wald et al. | |
| 2011/0173208 A1 | 7/2011 | Vogel | |

FOREIGN PATENT DOCUMENTS

| | | | |
|---|---|---|---|
| WO | 0120483 | A2 | 3/2001 |
| WO | 0137465 | A2 | 5/2001 |
| WO | 0211123 | A2 | 2/2002 |
| WO | 02065782 | A1 | 8/2002 |
| WO | 02077966 | A2 | 10/2002 |
| WO | 02093823 | A1 | 11/2002 |
| WO | 03067466 | A2 | 8/2003 |
| WO | WO 03/067467 | A1 | 8/2003 |
| WO | 03096337 | A2 | 11/2003 |
| WO | 2004044820 | A1 | 5/2004 |
| WO | 2004077430 | A1 | 9/2004 |
| WO | 2004081817 | A1 | 9/2004 |
| WO | 2009036435 | A1 | 3/2009 |

OTHER PUBLICATIONS

Sinitsyn, Alexander, Duplicate Song Detection using Audio Fingerprinting for Consumer Electronics Devices, Consumer Electronics, 2006. ISCE '06. 2006 IEEE Tenth International Symposium, St. Petersburg, Russia, 28-01 Jun. 2006, Piscataway, NJ, USA, Jun. 28, 2006, pp. 1-6.

Lagus et al., "Keyword selection method for characterizing text document maps", 1999, Artificial Neural Networks, Sep. 7-10, 1999, Conference Publication No. 470 © IEEE 1999, pp. 371-376.

Tzanetaski, G., "Multifeature Audio Segmentation for Browing and Annotation", pp. W99-1-W99-4; Proc. 1999 IEEE Workshop on applications of Signal Processing to Audio and Acoustics, New Paltz, New York, Oct. 17-20, 1999.

R. Venkatesan, S.M. Koon, M.H. Jakubowski and P. Moulin, "Robust Image Hashing", ICIP'00-IEEE International Conference on Image Processing, Vancouver, Sep. 10-13, 2000.

Haitsma, J., et al., "Robust Audio Flashing for content Identification," in Proceedings of the Content-Based Multimedia Index, Italy (Sep. 2001).

Chun-Shien Lu "Audio Fingerprinting Based on Analyzing Time-Frequency Localization of Signals", IEEE, pp. 174-177 (2002).

Haitsma, J., et al., "An Efficient Database Search Strategy for Audio Fingerprinting", in Proceedings of the 2003 IEEE Radar Conference, Dec. 9, 2002, pp. 178-181.

Haitsma, J., et al., "A Highly Robust Audio Fingerprinting System", ISMIR 2002, 3rd Int'l Conference on Music Information Retrieval, IRCAM-Centre Pompidou, Paris, France, Oct. 13-17, 2002, pp. 1-9.

Avery Li-Chun Wang, "An Industrial-Strength Audio Search Algorithm", Proc. of 4th International Conference on Music Information Retrieval, Baltimore, MD, Oct. 27, 2003.

Steven Scott Lutz, "Hokua—a Wavelet Method for Audio Fingerprinting", M.S. Thesis, pp. i-82, Dec. 31, 2009.

* cited by examiner

MANAGING METADATA FOR OCCURRENCES OF A RECORDING

FIELD OF THE INVENTION

The invention relates to managing metadata. More particularly, the invention relates to managing metadata for occurrences of a recording by storing an internal identifier in the metadata.

BACKGROUND

Previously, a conventional optical disc does not have certain metadata on the disc. Examples of optical discs include a compact disc (CD), a digital video disc (DVD) and a Blu-ray Disc. Metadata are data that may be used to describe or identify a recording. Accordingly, these discs cannot be recognized by referring to metadata on the disc because there is typically no metadata on the disc.

A conventional compact disc is typically recognized by reading table of contents data from the disc and using the data to lookup information in a database. U.S. Pat. Nos. 6,230,192 and 6,330,593 (the '192 and '593 patents), which are hereby incorporated by reference, provide conventional examples of such a method. The '192 and the '593 patents relate generally to delivering supplemental entertainment content to a user listening to a musical recording. Using conventional techniques, an album identifier is computed for the album being played. The album identifier may be determined based on the number and lengths of tracks on the album. The album identifier is used to retrieve, from a database, information relating to the recordings played by the user.

SUMMARY

An identifier is typically associated with information in a database. For example, a fingerprint is an identifier that is typically associated with metadata in a database. Metadata for a CD may include, for example, song name, artist information, album information and/or other types of supplemental information. A conventional system may compute an identifier upon detection of, for example, a compact disc in a CD player of the user's computer and send the album identifier to a remote server hosting a Web site containing information about the albums.

A conventional server uses the identifier as a key to search for at least one matching record in a database that contains metadata about various CDs. Searching data of a conventional server is an operation that a user device may initiate over a network, such as the Internet. Data is organized in some manner in the conventional server to which the user device sends a query. Upon finding a match for the queried identifier, the conventional server may send the relevant metadata stored in that matching record to the user device. The user device may then display the metadata.

Unfortunately, conventional systems do not account for some of the obstacles related to identifying recordings. The advent of digital media (e.g., audio, video and metadata) has caused the sheer size of data to become enormous. When a user device queries a server, the server may have to search through an enormous amount of data to provide a result for the query.

Conventional methods of retrieving data are decreasing in efficiency because methods of searching data sets are not evolving as quickly as the data sets are getting bigger.

Conventional systems typically use inefficient techniques for organizing media data. For example, conventional systems do not attach an identifier to metadata of a recording. This lack of attaching an identifier to metadata is problematic, for example, when different occurrences of one particular track have different metadata associated with each particular occurrence. One occurrence of a particular track may have metadata that includes a track title of "Piano Sonata No. 11". Another occurrence of a recording may have metadata that includes a track title of "Allegro for Brass". Such a discrepancy in the metadata would prevent a collection of tracks from being organized effectively by using the metadata because the metadata are different for the different occurrences of the recording. Such discrepancies in metadata are common in conventional systems that generate metadata for media data. Media data is the content upon which metadata are based. One example of media data is a musical recording.

In a first embodiment, a method is provided for storing an internal identifier in metadata. The method comprises the following: receiving a recording, wherein the recording includes computer readable media data; generating an internal identifier for the recording, wherein the internal identifier is a signature that uniquely identifies the recording; and adding the internal identifier to metadata associated with at least one occurrence of the recording, wherein the metadata is data that describes the recording.

In a second embodiment, a system is provided for storing an internal identifier in metadata. The system is configured for the following: receiving a recording, wherein the recording includes computer readable media data; generating an internal identifier for the recording, wherein the internal identifier is a signature that uniquely identifies the recording; and adding the internal identifier to metadata associated with at least one occurrence of the recording, wherein the metadata is data that describes the recording.

In a third embodiment, a computer readable medium comprises one or more instructions for storing an internal identifier in metadata. The one or more instructions, when executed by one or more processors, cause the one or more processors to perform the following steps: receiving a recording, wherein the recording includes computer readable media data; generating an internal identifier for the recording, wherein the internal identifier is a signature that uniquely identifies the recording; and adding the internal identifier to metadata associated with at least one occurrence of the recording, wherein the metadata is data that describes the recording.

In a fourth embodiment, a method is provided for linking metadata. The method comprises the following: receiving metadata for one or more occurrences of a recording, wherein the metadata for each occurrence of the recording includes an internal identifier of the recording; and generating a link between each internal identifier in the metadata and an external identifier not in the metadata, wherein the external identifier is derived from the recording.

In a fifth embodiment, a system is provided for linking metadata. The system is configured for the following: receiving metadata for one or more occurrences of a recording, wherein the metadata for each occurrence of the recording includes an internal identifier of the recording; and generating a link between each internal identifier in the metadata and an external identifier not in the metadata, wherein the external identifier is derived from the recording.

In a sixth embodiment, a computer readable medium comprises one or more instructions for storing an internal identifier in metadata. The one or more instructions, when executed by one or more processors, cause the one or more processors to perform the following steps: receiving metadata for one or more occurrences of a recording, wherein the metadata for each occurrence of the recording includes an internal identifier of the recording; and generating a link between each internal identifier in the metadata and an external identifier not in the metadata, wherein the external identifier is derived from the recording.

The internal identifier may be added to the metadata for each of the occurrences. The internal identifier preferably identifies each occurrence as belonging to a same recording. Each occurrence may be, for example, one of the following: from a different album than at least one other occurrence; associated with metadata having a different artist than at least one other occurrence; and absent of metadata besides the internal identifier.

The recording may include, for example, an audio track, a video track, a song, a chapter, a CD recording, a DVD recording, and/or a Blu-ray Disc recording. The identifier may include, for example, an audio fingerprint, a portion of an audio fingerprint, an identifier derived from an audio fingerprint, an audio identifier, a video identifier, a disc identifier, a compact disc identifier, a digital video disc identifier, a Blu-ray Disc identifier, a media identifier and/or a high definition media identifier.

The invention encompasses other embodiments configured as set forth above and with other features and alternatives. It should be appreciated that the invention can be implemented in numerous ways, including as a method, a process, an apparatus, a system or a device.

BRIEF DESCRIPTION OF THE DRAWINGS

The invention will be readily understood by the following detailed description in conjunction with the accompanying drawings. To facilitate this description, like reference numerals designate like structural elements.

DETAILED DESCRIPTION

An invention is disclosed for a method and a system for managing metadata for occurrences of a recording. Numerous specific details are set forth in order to provide a thorough understanding of the invention. It will be understood, however, to one skilled in the art, that the invention may be practiced with other specific details.

DEFINITIONS

Some terms are defined below in alphabetical order for easy reference. These terms are not rigidly restricted to these definitions. A term may be further defined by its use in other sections of this description.

"Album" means a collection of tracks. An album is typically originally published by an established entity, such as a record label (e.g., recording company, such as Warner or Universal).

"Audio Fingerprint" (e.g., "fingerprint", "acoustic fingerprint", or "digital fingerprint") is a digital measure of certain acoustic properties that is deterministically generated from an audio signal that can be used to identify an audio sample and/or quickly locate similar items in an audio database. An audio fingerprint typically operates as a unique identifier for a particular item, such as, for example, a CD, a DVD and/or a Blu-ray Disc. The term "identifier" is defined below. An audio fingerprint is an independent piece of data that is not affected by metadata. The company Macrovision® has databases that store over 25 million unique fingerprints for various audio samples. Practical uses of audio fingerprints include without limitation identifying songs, identifying records, identifying melodies, identifying tunes, identifying advertisements, monitoring radio broadcasts, monitoring peer-to-peer networks, managing sound effects libraries and/or identifying video files.

"Audio Fingerprinting" is the process of generating an audio fingerprint. U.S. Pat. No. 7,277,766 (the '766 patent), entitled "Method and System for Analyzing Digital Audio Files", which is herein incorporated by reference, provides an example of an apparatus for audio fingerprinting an audio waveform. U.S. patent application Ser. No. 10/905,360 (U.S. Publication No. 2006/0149533), entitled "Methods and Apparatus for Identifying Media Objects", which is herein incorporated by reference, provides an example of an apparatus for generating an audio fingerprint of an audio recording.

"Blu-ray", also known as Blu-ray Disc, means a disc format jointly developed by the Blu-ray Disc Association, and personal computer and media manufacturers (including Apple, Dell, Hitachi, HP, JVC, LG, Mitsubishi, Panasonic, Pioneer, Philips, Samsung, Sharp, Sony, TDK and Thomson). The format was developed to enable recording, rewriting and playback of high-definition video (HD), as well as storing large amounts of data. The format offers more than five times the storage capacity of conventional DVDs and can hold 25 GB on a single-layer disc and 800 GB on a 20-layer disc. More layers and more storage capacity may be feasible as well. This extra capacity combined with the use of advanced audio and/or video codecs offers consumers an unprecedented HD experience. While current disc technologies, such as CD and DVD, rely on a red laser to read and write data, the Blu-ray format uses a blue-violet laser instead, hence the name Blu-ray. The benefit of using a blue-violet laser (605 nm) is that it has a shorter wavelength than a red laser (650 nm). A shorter wavelength makes it possible to focus the laser spot with greater precision. This added precision allows data to be packed more tightly and stored in less space. Thus, it is possible to fit substantially more data on a Blu-ray Disc even though a Blu-ray Disc may have the substantially similar physical dimensions as a traditional CD or DVD.

"Chapter" means an audio and/or video data block on a disc, such as a Blu-ray Disc, a CD or a DVD. A chapter stores at least a portion of an audio and/or video recording.

"Compact Disc" (CD) means a disc used to store digital data. A CD was originally developed for storing digital audio. Standard CDs have a diameter of 740 mm and can typically hold up to 80 minutes of audio. There is also the mini-CD, with diameters ranging from 60 to 80 mm. Mini-CDs are sometimes used for CD singles and typically store up to 24 minutes of audio. CD technology has been adapted and expanded to include without limitation data storage CD-ROM, write-once audio and data storage CD-R, rewritable media CD-RW, Super Audio CD (SACD), Video Compact Discs (VCD), Super Video Compact Discs (SVCD), Photo CD, Picture CD, Compact Disc Interactive (CD-i), and Enhanced CD. The wavelength used by standard CD lasers is 650 nm, and thus the light of a standard CD laser typically has a red color.

"Database" means a collection of data organized in such a way that a computer program may quickly select desired pieces of the data. A database is an electronic filing system. In some implementations, the term "database" may be used as shorthand for "database management system".

"Device" means software, hardware or a combination thereof. A device may sometimes be referred to as an apparatus. Examples of a device include without limitation a software application such as Microsoft Word®, a laptop computer, a database, a server, a display, a computer mouse, and a hard disk. Each device is configured to carry out one or more steps of the method of storing an internal identifier in metadata.

"Digital Video Disc" (DVD) means a disc used to store digital data. A DVD was originally developed for storing digital video and digital audio data. Most DVDs have the substantially similar physical dimensions as compact discs (CDs), but DVDs store more than six times as much data. There is also the mini-DVD, with diameters ranging from 60 to 80 mm. DVD technology has been adapted and expanded to include DVD-ROM, DVD-R, DVD+R, DVD-RW, DVD+RW and DVD-RAM. The wavelength used by standard DVD lasers is 650 nm, and thus the light of a standard DVD laser typically has a red color.

"Fuzzy search" (e.g., "fuzzy string search" or "approximate string search") means a search for text strings that approximately or substantially match a given text string pattern. Fuzzy searching may also be known as approximate or inexact matching. An exact match may inadvertently occur while performing a fuzzy search.

"Identifier" means a signature that uniquely identifies an item, such as, for example, a track, a song, an album, a CD, a DVD and/or Blu-ray Disc, among other items. Examples of an identifier include without limitation the following in a computer-readable format: an audio fingerprint, a portion of an audio fingerprint, an identifier derived from an audio fingerprint, an audio identifier, a video identifier, a disc identifier, a CD identifier, a DVD identifier, a Blu-ray Disc identifier, a media identifier, a high definition media identifier, a human fingerprint, a human footprint, an animal fingerprint, an animal footprint, a handwritten signature, an eye print, a biometric identifier, a retinal identifier, a retinal scan, a DNA identifier, a DNA profile, a genetic identifier and/or a genetic profile, among other identifiers. An identifier may be any computer-readable string of characters that comports with any coding standard in any language. Examples of a coding standard include without limitation alphabet, alphanumeric, decimal, hexadecimal, binary, American Standard Code for Information Interchange (ASCII), Unicode and/or Universal Character Set (UCS). Certain identifiers may not initially be computer-readable. For example, latent human fingerprints may be printed on a door knob in the physical world. An Identifier that is initially not computer-readable may be converted into a computer-readable identifier by using any appropriate conversion technique. For example, a conversion technique for converting a latent human fingerprint into a computer-readable identifier may include a ridge characteristics analysis.

"Link" means an association with an object or an element in memory. A link is typically a pointer. A pointer is a variable that contains the address of a location in memory. The location is the starting point of an allocated object, such as an object or value type, or the element of an array. The memory may be located on a database or a database system. "Linking" means associating with (e.g., pointing to) an object in memory.

"Metadata" generally means data that describes data. More particularly, metadata may be used to describe the contents of digital recordings. Such metadata may include, for example, a track name, a song name, artist information (e.g., name, birth date, discography, etc.), album information (e.g., album title, review, track listing, sound samples, etc.), relational information (e.g., similar artists and albums, genre, etc.) and/or other types of supplemental information. Conventional optical discs (e.g., CDs, DVDs and Blu-ray Discs) do not typically contain metadata. Metadata may be associated with a digital recording (e.g., song, album, movie or video) after the digital recording has been ripped from an optical disc, converted to another digital audio format and stored on a hard drive.

"Network" means a connection between any two or more computers, which permits the transmission of data. A network may be any combination of networks, including without limitation the Internet, a local area network, a wide area network, a wireless network and a cellular network.

"Occurrence" means a copy of a recording. An occurrence is preferably an exact copy of a recording. For example, different occurrences of a same pressing are typically exact copies. However, an occurrence is not necessarily an exact copy of a recording, and may be a substantially similar copy. A recording may be an inexact copy for a number of reasons, including without limitation an imperfection in the copying process, different pressings having different settings, different copies having different encodings, and other reasons. Accordingly, a recording may be the source of multiple occurrences that may be exact copies or substantially similar copies. Different occurrences may be located on different devices, including without limitation different user devices, different mp3 players, different databases, different laptops, and so on. Each occurrence of a recording may be located on any appropriate storage medium, including without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of storage device. Occurrences may be compiled, such as in a database or in a listing.

"Pressing" (e.g., "disc pressing") means producing a disc in a disc press from a master. The disc press preferably includes a laser beam having a bandwidth of about 650 nm for DVD or about 605 nm for Blu-Disc.

"Recording" means media data for playback. A recording is preferably a computer readable digital recording and may be, for example, an audio track, a video track, a song, a chapter, a CD recording, a DVD recording and/or a Blu-ray Disc recording, among other things.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"Song" means a musical composition. A song is typically recorded onto a track by a record label (e.g., recording company). A song may have many different versions, for example, a radio version and an extended version.

"System" means a device or multiple coupled devices. A device is defined above.

"Track" means an audio/video data block. A track may be on a disc, such as, for example, a Blu-ray Disc, a CD or a DVD.

"User" means a consumer, client, and/or client device in a marketplace of products and/or services.

"User device" (e.g., "client", "client device" or "user computer") is a hardware system, a software operating system and/or one or more software application programs. A user device may refer to a single computer or to a network of interacting computers. A user device may be the client part of a client-server architecture. A user device typically relies on a server to perform some operations. Examples of a user device include without limitation a CD player, a DVD player, a Blu-ray Disc player, a personal media device, a portable media player, an iPod®, a Zoom Player, a laptop computer, a palmtop computer, a smart phone, a cell phone, a mobile phone, an mp3 player, a digital audio recorder, a digital video recorder, an IBM-type personal computer (PC) having an operating system such as Microsoft Windows®, an Apple® computer having an operating system such as MAC-OS, hardware having a JAVA-OS operating system, and a Sun Microsystems Workstation having a UNIX operating system.

"Web browser" means any software program which can display text, graphics, or both, from Web pages on Web sites. Examples of a Web browser include without limitation Mozilla Firefox® and Microsoft Internet Explorer®.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo® Web server.

"Web site" means at least one Web page, and more commonly a plurality of Web pages, virtually coupled to form a coherent group.

I

Overview of Architecture

Figure 1:
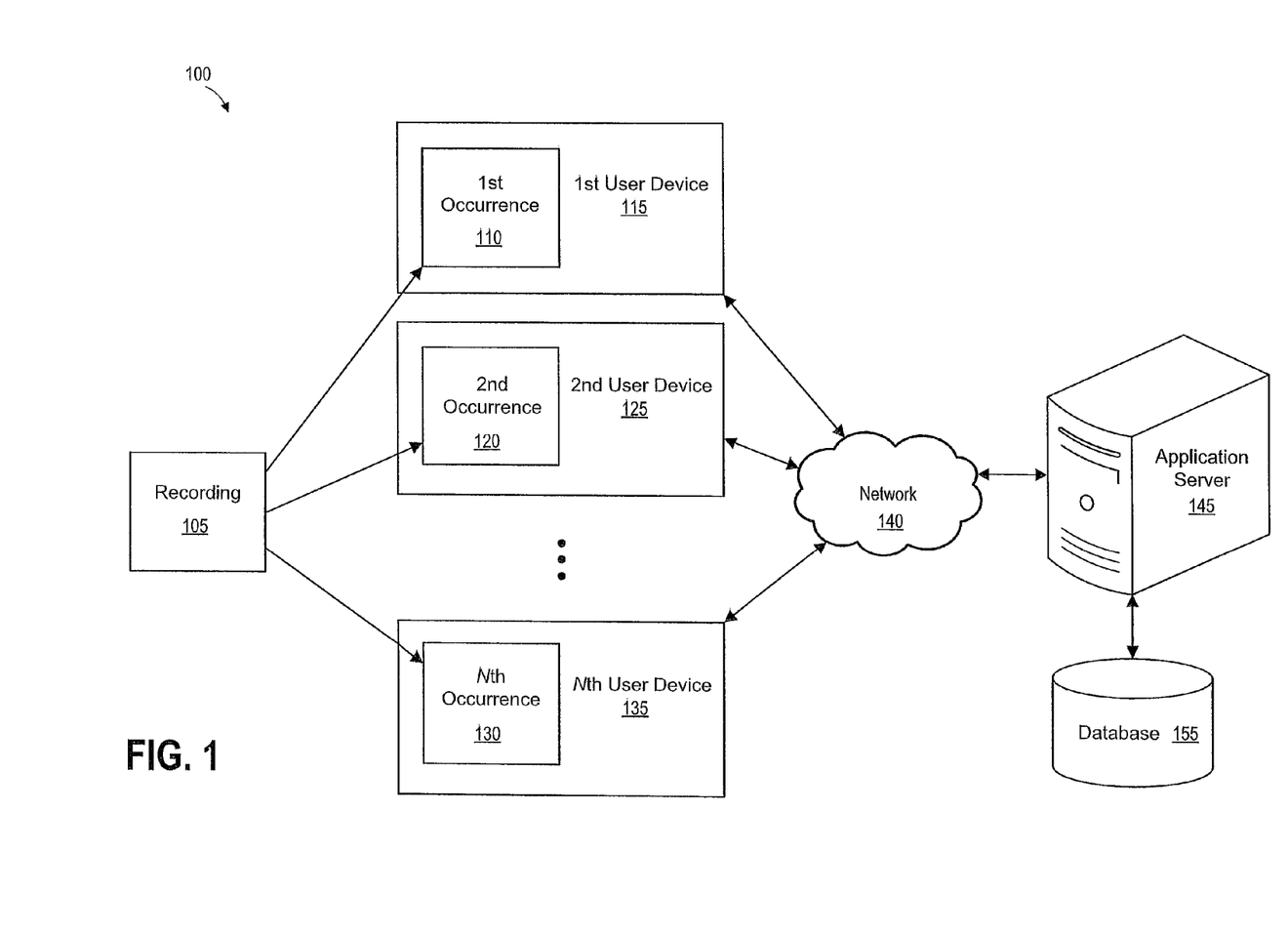
FIG. 1 is a block diagram of a system for managing metadata for occurrences of a recording, in accordance with some embodiments.

FIG. 1 is a block diagram of a system 100 for managing metadata for occurrences of a recording, in accordance with some embodiments. A network 140 is coupled to an application server 145 and N user devices, where N is a positive integer. The system 100 includes a 1st user device 115, a 2nd user device, and other user devices up to an Nth user device 135.

The application server 145 is preferably coupled to (or includes) a database 155. The remote database 155 may store, among other things, data collected and/or generated from an item stored in one or more user devices. The database 155 preferably includes metadata associated with occurrences of recordings. The database 155 may also include data associated items, such as, for example albums, CDs, DVDs and/or Blu-ray Discs, among other things.

A user device may be, for example, a laptop computer, a standalone disc player, an mp3 player or a smart phone, among other things. A user device may store, among other things, an occurrence of a recording 105. An occurrence is a copy of the recording 105. An occurrence may be, for example, a track that is uploaded from a CD that is inputted into the user device. An occurrence is preferably an exact copy of the recording 105. For example, different occurrences of a same pressing are typically exact copies. However, an occurrence is not necessarily an exact copy of a recording, and may be a substantially similar copy. A recording may be an inexact copy for a number of reasons, including without limitation an imperfection in the copying process, different pressings having different settings, different copies having different encodings, and other reasons. The recording 105 may be released in a multitude of different ways and in different contexts. For example, a given recording may exist on an original CD, a greatest hits CD, a mix CD, a movie soundtrack, a DVD and/or a digital file, among other things.

Accordingly, the recording 105 may have multiple occurrences, as shown in FIG. 1. In this system 100, one occurrence is stored in each user device. A 1st occurrence 110 is stored in the 1st user device 115. A 2nd occurrence 120 is stored in the 2nd user device 125. An Nth occurrence 130 is stored in the Nth user device 135, where N is a positive integer. Other configurations exist as well. For example, multiple occurrences of the recording 105 may be located in a single user device.

Each user device preferably includes hardware and/or software configured for communicating with the application server 145. For example, a user device may have an operating system with a graphical user interface (GUI) to access the Internet and is preferably equipped with World Wide Web (Web) browser software, such as Mozilla Firefox®, operable to read and send Hypertext Markup Language (HTML) forms from and to a Hypertext Transport Protocol (HTTP) server on the Web. A standalone disc player may have a built-in interface that enables the player to communicate with the application server 145 via the network 140, either directly or through another computer. For example, a disc player may have a data interface (e.g., an IDE interface or a USB interface) that enables the disc player to send and receive data from a laptop computer, which in turn is coupled to the network 140.

Likewise, the application server 145 preferably includes software and/or hardware for communicating with the user device 725. For example, the application server 145 may have HTTP compliant software, an operating system and common gateway interface (CGI) software for interfacing with a user device via the network 140. Alternatively, the application server 145 and a user device may run proprietary software that enables them to communicate via the network 140.

It will be readily appreciated that the schematic of FIG. 1 is for explanatory purposes, and that numerous variations are possible. For example, the application server 145 may be coupled to a local area network (LAN), which in turn may be coupled to the network 140. In another example, the application server 145 may be coupled to multiple Web servers. In yet another example, the system 100 may include a database (or system of databases) arranged in a different configuration than the database 155 depicted here. Other configurations exist as well.

II

Metadata Associated with an Occurrence of a Recording

Metadata generally means data that describes data. More particularly, metadata may be used to describe the contents of a digital audio/video recording. Metadata may include, for example, song name, artist information (e.g., name, birth date, discography, etc.), album information (e.g., album title, review, track listing, sound samples, etc.), relational information (e.g., similar artists and albums, genre, etc.) and/or other types of supplemental information. Conventional optical discs (e.g., CDs, DVDs and Blu-ray Discs) do not typically contain metadata. Metadata may be associated with a digital recording (e.g., song, album, movie or video) after the digital recording has been ripped from an optical disc, converted to another digital audio format and stored on a hard drive.

Figure 2:
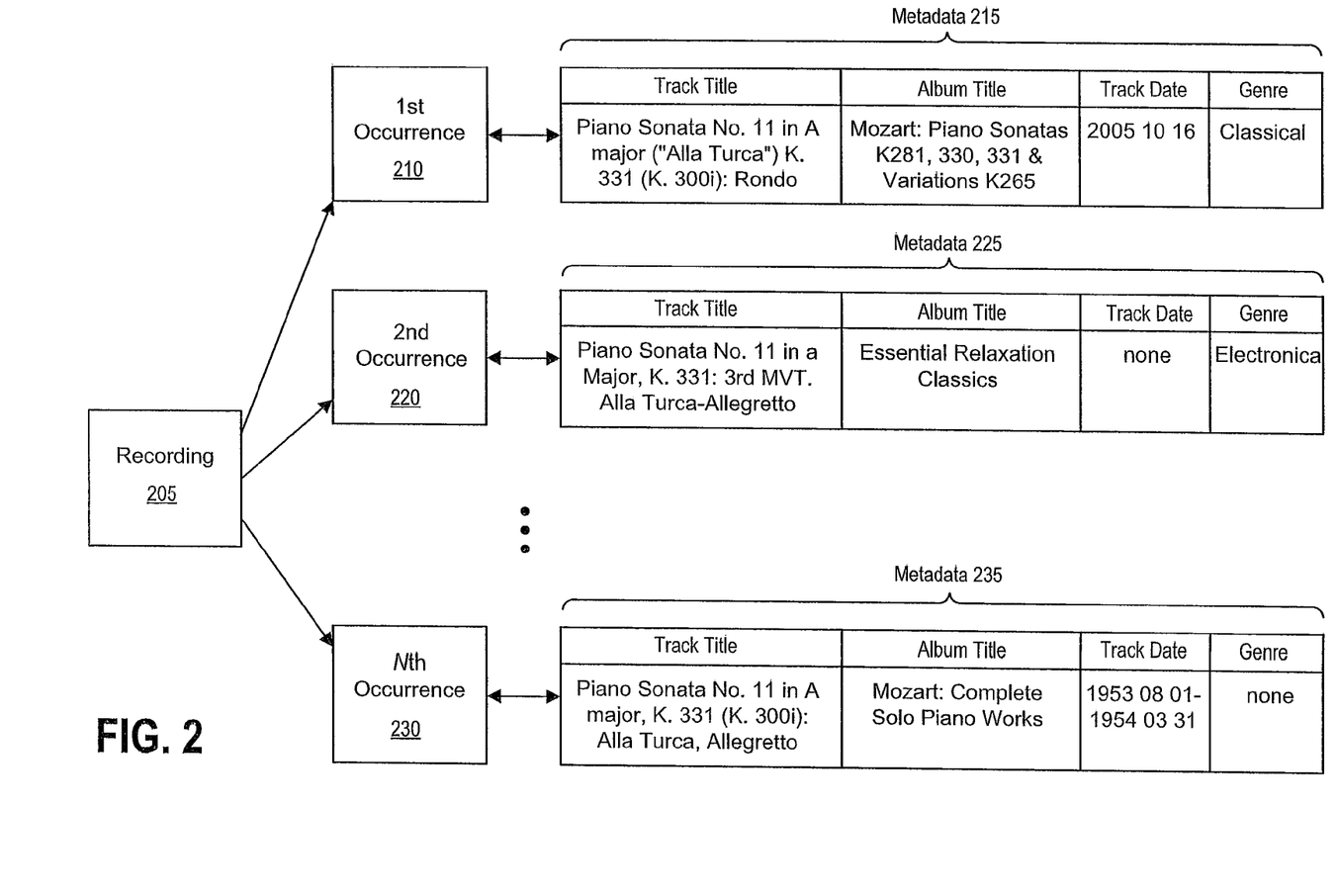
FIG. 2 is a schematic diagram of a recording having multiple occurrences that are associated with metadata, in accordance with some embodiments.

FIG. 2 is a schematic diagram of a recording 205 having multiple occurrences that are associated with metadata, in accordance with some embodiments. The recording 205 has N occurrences, where N is a positive integer. The occurrences include a first occurrence 210, a second occurrence 220 and other occurrences up to an Nth occurrence 230. Each occurrence is associated with metadata. In this embodiment, the first occurrence is associated with metadata 215, which includes a track title, an album title, a track date, and a genre. The second occurrence is associated with metadata 225, which includes a track title, an album title and a genre. The Nth occurrence is associated with metadata 235, which includes a track title, an album title and a track date.

The metadata for different occurrences may be different. For example, metadata 215 associated with the first occurrence 210 is different than metadata 225 associated with the second occurrence 220, and so on. In this embodiment, metadata 215 has an album title of "Mozart: Piano Sonatas K281, 330, 331 & Variations K265", while metadata 225 has an album title of "Essential Relaxation Classics". It is readily apparent that the metadata for each different occurrence are different in other ways as well.

These metadata of FIG. 2 are different, but are nevertheless referring to the same recording 205. Metadata may be different for a number of reasons. One reason for the metadata differences may be, for example, that metadata 215 may be inputted by the recording company that originally produced the recording 205, while metadata 225 may be inputted by an end user who has edited the metadata. Another reason for the metadata differences may be, for example, that the different metadata may refer to the same recording 205 but with different occurrences that are on different albums. According to the metadata in FIG. 2, the second occurrence 220 is from the album "Essential Relaxation Classics", while the Nth occurrence is from the album "Mozart: Complete Solo Piano Works". Other reasons for differences in metadata exist as well. These metadata are different, but are still referring to the same recording 205.

Accordingly, different occurrences of the same recording 205 may initially appear to be substantially different if one were to refer to the different metadata alone. It is unclear, by reading only the metadata of FIG. 2, that all of the metadata are referring to the same recording 205 and that the associated occurrences are substantially similar. It may be difficult to organize or analyze such metadata by reading the metadata only. Further, the metadata may be mixed with metadata for occurrences of another recording. If the metadata of FIG. 2 were mixed with metadata for occurrences of another recording, then organizing and analyzing the metadata would be increasingly more difficult.

Embodiments described below provide a more reliable association directly within the metadata. Accordingly, in these embodiments, a reading of metadata alone advantageously reveals different occurrences that originate from the audio/visual data of the same recording.

Storing an Internal Identifier in Metadata

A first aspect of managing metadata involves storing an internal identifier in metadata for an occurrence of a recording. The system may derive an internal identifier from the audio/video data of each occurrence. The system may, for example, generate an internal identifier based on a track ripped from a CD inputted into a user device. The internal identifier may be, for example, a digital fingerprint or a portion thereof. The internal identifier may be added to the metadata for the occurrences of the recording. This addition to the metadata allows the system to identify various metadata for the occurrences of the recording, even if the occurrences originate from different albums, are absent of metadata besides the internal identifier, and/or are associated with metadata that claim different artists, among other things.

Figure 3:
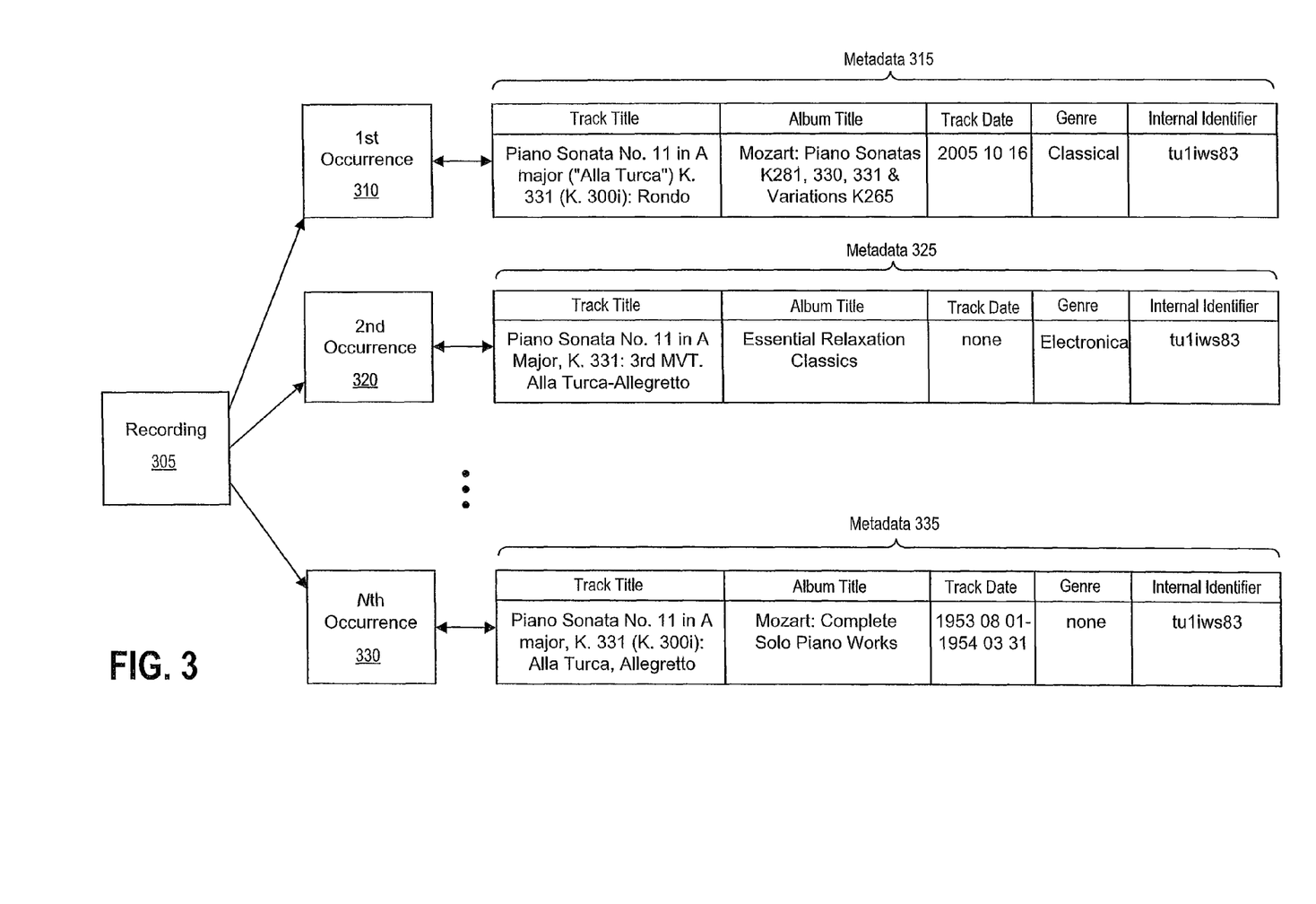
FIG. 3 is a schematic diagram of a recording having multiple occurrences that are associated with metadata that include internal identifiers, in accordance with some embodiments.

FIG. 3 is a schematic diagram of a recording 305 having multiple occurrences that are associated with metadata that include internal identifiers, in accordance with some embodiments. The metadata of FIG. 3 includes additions of a unique internal identifier "tuliws83". In the embodiment of FIG. 3, the system generates the unique internal identifier for the recording. For this recording, the internal identifier that is generated is "tuliws83". As shown in FIG. 3, the system adds the unique identifier "tuliws83" to the metadata for each occurrence of the recording.

The recording 305 has N occurrences, where N is a positive integer. The occurrences include a first occurrence 310, a second occurrence 320 and other occurrences up to an Nth occurrence 330. Each occurrence is associated with enhanced metadata. In this embodiment, the first occurrence is associated with metadata 315, which includes a track title, an album title, a track date, a genre and an internal identifier. The second occurrence is associated with metadata 325, which includes a track title, an album title, a genre and the internal identifier. The Nth occurrence is associated with metadata 335, which includes a track title, an album title, a track date and the internal identifier.

The enhanced metadata for different occurrences may be different, while having the same internal identifier. For example, metadata 315 associated with the first occurrence 310 is different than metadata 325 associated with the second occurrence 320, and so on. In this embodiment, metadata 315 has an album title of "Mozart: Piano Sonatas K281, 330, 331 & Variations K265", while metadata 325 has an album title of "Essential Relaxation Classics". It is readily apparent that the enhanced metadata in FIG. 3 are different from each other in other ways as well. Nevertheless, the different metadata of FIG. 3 each includes the same internal identifier "tuliws83".

These enhanced metadata of FIG. 3 are different, but are nevertheless referring to the same recording 305, as is readily apparent because each different metadata includes the same internal identifier "tuliws83". Metadata may be different for a number of reasons. One reason for the metadata differences may be, for example, that metadata 315 may be inputted by the recording company that originally produced the recording 305, while metadata 325 may be inputted by an end user who has edited the metadata. Another reason for the metadata differences may be, for example, that the different metadata may refer to the same recording 305 but with different occurrences that are on different albums. According to the metadata in FIG. 3, the second occurrence 320 is from the album "Essential Relaxation Classics", while the Nth occurrence is from the album "Mozart: Complete Solo Piano Works". Other reasons for differences in metadata exist as well. These metadata are different, but are still referring to the same recording 305, as is readily apparent because of the same internal identifier "tuliws83".

It is readily apparent, by reading only the metadata of FIG. 3, that all of the metadata are referring to the same recording because of the unique internal identifier "tuliws83". Accordingly, it is easy for a system to organize and/or analyze such metadata by reading the metadata. Further, the metadata may be mixed with metadata for occurrences of another recording. If the metadata of FIG. 3 were mixed with metadata for occurrences of another recording, then organizing and/or analyzing the metadata is still easy because of the unique internal identifier "tuliws83". The metadata for each occurrence of the recording in FIG. 3 has a reliable association directly in the metadata.

Adding the identifier to the metadata allows the system to identify the recording 105 regardless of what other metadata may indicate. The internal identifiers in the metadata allow the unique identification of the metadata across any source that may store the metadata. The system may use the internal identifiers in the metadata to manage and/or collect the metadata for the occurrences of the recording 105.

The descriptions of FIG. 2 and FIG. 3 are provided for explanatory purposes. Other configurations exist as well. For example, metadata may describe something other than a single audio track. Metadata may describe, for example, a chapter on a DVD, a chapter on a Blu-ray Disc and/or a video file, among other things. Other uses for metadata exist as well. Further, an internal identifier may include, for example, an audio fingerprint itself, a portion of an audio fingerprint, an identifier derived from an audio fingerprint, an audio identifier, a video identifier, a disc identifier, a CD identifier, a DVD identifier, a Blu-ray Disc identifier, a media identifier and/or a high definition media identifier, among other identifiers.

Overview of Method for Storing an Internal Identifier in Metadata

Figure 4:
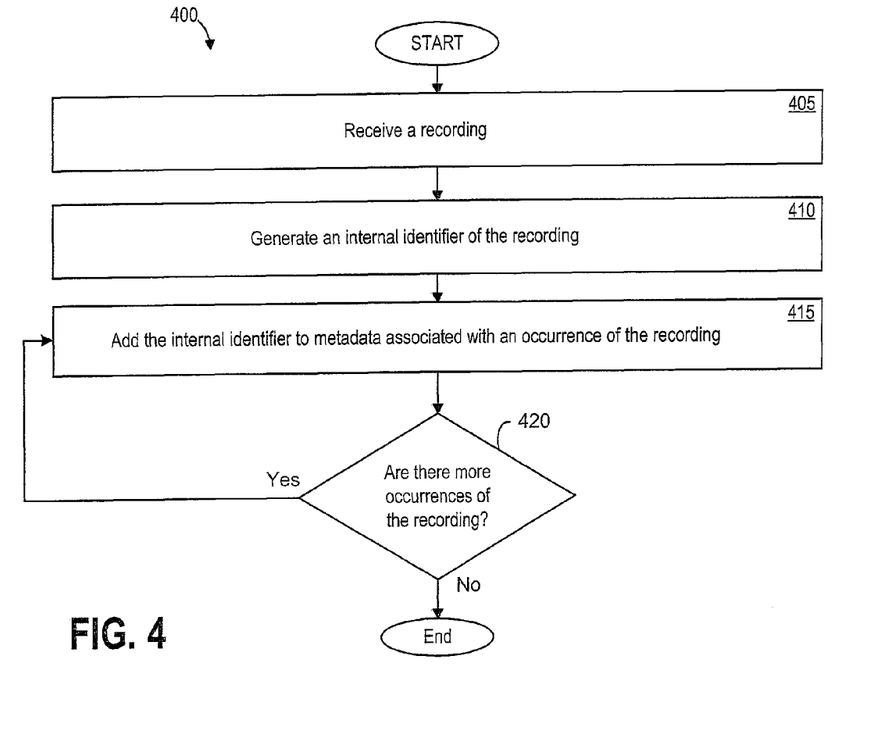
FIG. 4 is a flowchart of a method for storing an internal identifier in metadata for an occurrence of a recording, in accordance with some embodiments.

FIG. 4 is a flowchart of a method 400 for storing an internal identifier in metadata for an occurrence of a recording, in accordance with some embodiments. The steps of the method 400 are preferably carried out by one or more devices of the system 100 of FIG. 1.

The method 400 starts in a step 405 where the system receives a recording. A recording is media data for playback. A recording is preferably a digital recording and may be, for example, an audio track, a video track, a song, a chapter, a CD recording, a DVD recording and/or a Blu-ray Disc recording, among other things. The method 400 then moves to a step 410 where the system generates an internal identifier of the recording. An identifier is preferably a signature that uniquely identifies an item, such as, for example, a track, a song, an album, a CD, a DVD and/or Blu-ray Disc, among other items.

Next, in a step 415, the system adds the internal identifier to the metadata associated with an occurrence of the recording. The internal identifier is added to the metadata as discussed above with reference to FIG. 3. Metadata generally means any data that describes the recording. Such metadata may include, for example, song name, artist information (e.g., name, birth date, discography, etc.), album information (e.g., album title, review, track listing, sound samples, etc.), relational information (e.g., similar artists and albums, genre, etc.) and/or other types of supplemental information.

Next, in a decision operation 420, the system 400 determines if there are more occurrences of the recording. FIG. 3 above shows an example of multiple occurrences of a single recording. If the system determines that there are more occurrences of the recording, then the system returns to the step 415 where the system adds the internal identifier to metadata for the additional occurrences. However, in the decision operation 420, if the system determines that there are no more occurrences of the recording, then the method 400 concludes after the decision operation 420.

Note that the method 400 may include other details that are not discussed in this method overview. Other details are discussed with reference to the appropriate figures and may be a part of the method 400, depending on the embodiment.

III

Linking the Internal Identifier to an External Identifier

A second aspect of managing metadata involves linking an internal identifier to an external identifier. Linking an internal identifier to an external identifier allows the metadata to be searched, located and/or organized in a more efficient manner.

Figure 5:
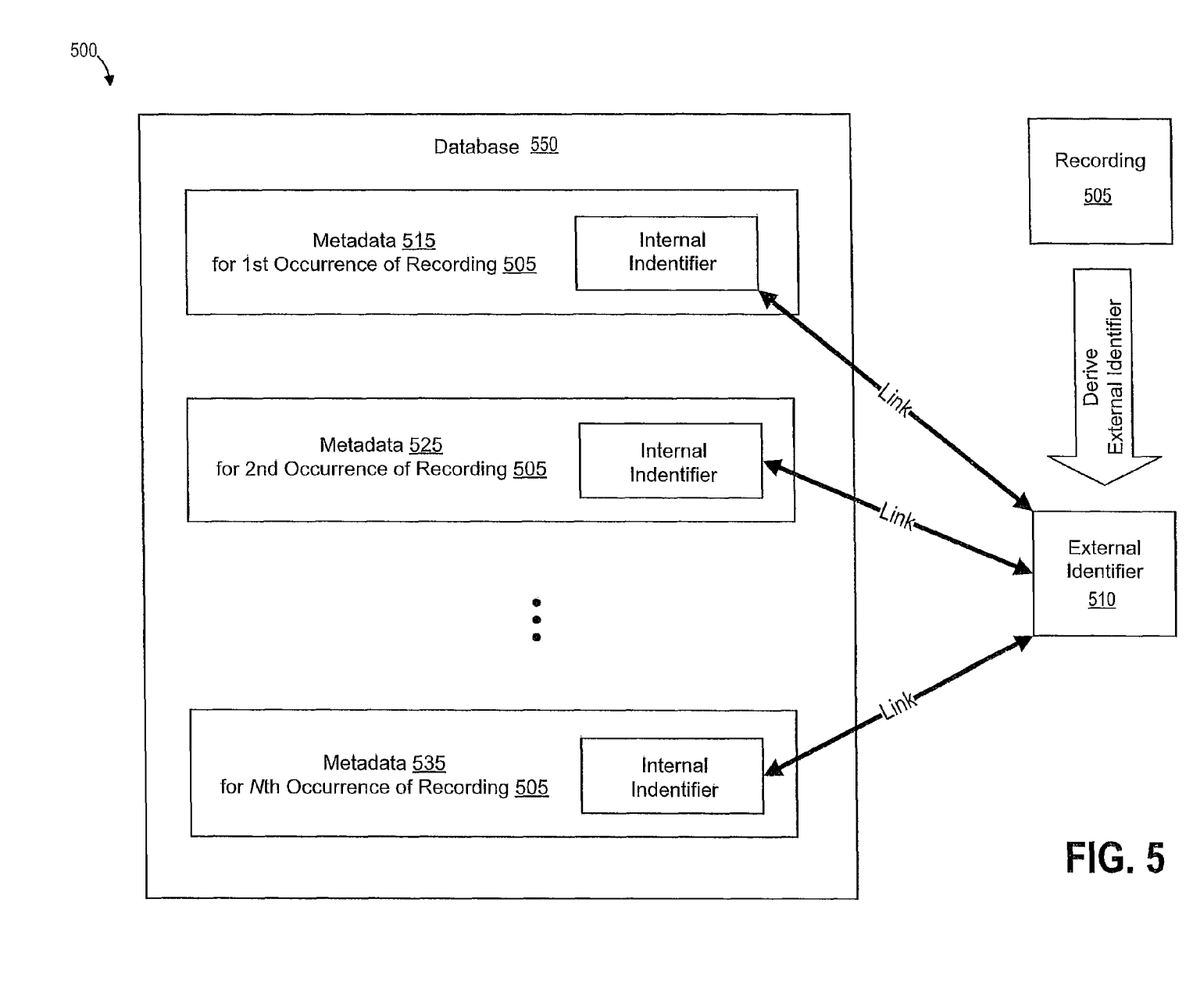
FIG. 5 shows a schematic diagram of a system for linking internal identifiers of metadata to an external identifier, in accordance with some embodiments.

FIG. 5 shows a schematic diagram of a system 500 for linking internal identifiers of metadata to an external identifier 510, in accordance with some embodiments. The system 500 preferably derives the external identifier 510 from the audio/video data of a recording 505.

The system 500 preferably generates and maintains one or more links between the external identifier 510 and the internal identifier. The maintenance of the links allows the metadata to be searched, located and/or organized in a more efficient manner, as described below with reference to FIG. 7. A link between the external identifier 510 and an internal identifier may be, for example, a pointer. The external identifier 510 may be, for example, an audio fingerprint, among other things.

The internal identifier is located in metadata of one or more occurrences of the recording 505. The metadata of the one or more occurrences of the recording 505 are preferably located in a database 550. The database 550 includes metadata for a 1st through an Nth occurrence of the recording 505, where N is a positive integer. For example, the database 550 includes metadata 515 for a 1st occurrence of the recording 505, metadata 525 for a 2nd occurrence of the recording 505, and other metadata up to metadata 535 for an Nth occurrence of the recording 505.

The external identifier 510 is not located in the metadata. The external identifier 510 is preferably located in a device configured for searching, locating and/or organizing metadata for occurrences of the recording 505. For example, the external identifier 510 may be located in an application server that is configured for managing metadata of occurrences of the recording 505. Such an application server is described below with reference to FIG. 7.

Overview of Method for Linking an Internal Identifier to an External Identifier

Figure 6:
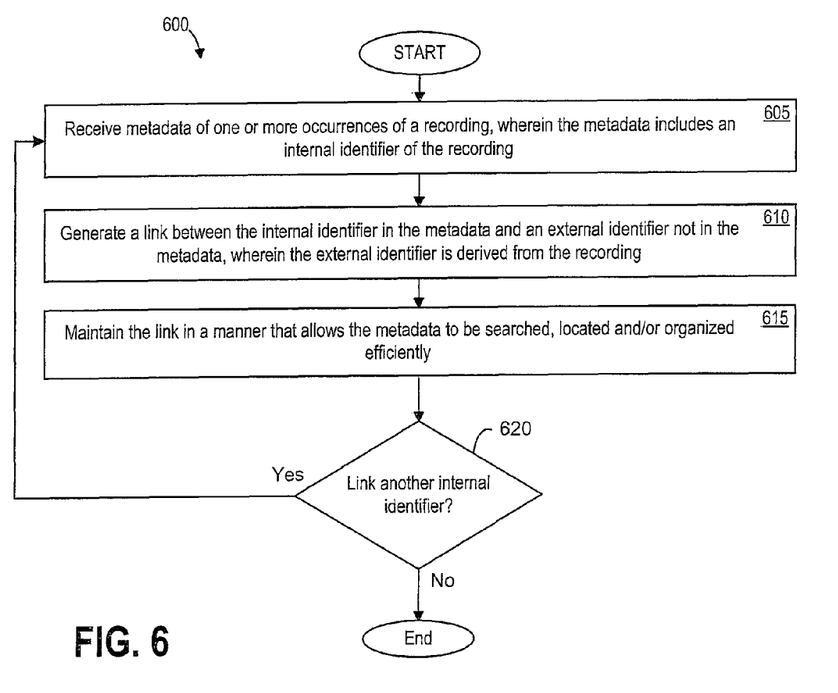
FIG. 6 is a flowchart of a method for linking an internal identifier to an external identifier, in accordance with some embodiments.

FIG. 6 is a flowchart of a method 600 for linking an internal identifier to an external identifier, in accordance with some embodiments. The steps of the method 600 are preferably carried out by one or more devices of the system 100 of FIG. 1.

The method 600 starts in a step 605 where the system receives metadata for one or more occurrences of a recording. The metadata that is received includes an internal identifier of the recording. The internal identifier may be previously stored in the metadata according to the method 400, which is described above with reference to FIG. 4.

The method 600 then moves to a step 610 where the system generates a link between the internal identifier in the metadata and an external identifier not in the metadata. The link may be, for example, a pointer. The external identifier is preferably derived from the recording. The external identifier may be, for example, an audio fingerprint, among other things. An audio fingerprint is a digital measure of certain acoustic properties that is deterministically generated from an audio signal that can be used to identify an audio sample and/or quickly locate similar items in an audio database. An audio fingerprint typically operates as a unique identifier for a particular item, such as, for example, a CD, a DVD and/or a Blu-ray Disc. The method 600 then proceeds to a step 615 where the system maintains the link in a manner that allows the metadata to be located more efficiently. The maintenance of the link may also allow the system to search, organize and/or analyze the metadata in a more efficient manner.

Next, in a decision operation 620, the system determines if another internal identifier in metadata for an occurrence of another recording is to be linked. If the system determines that another internal identifier in metadata for an occurrence of another recording is to be linked, then the method 600 returns to the step 605 where the system receives the metadata for the one or more occurrences of the recording. However, if in the decision operation 620, the system determines that another internal identifier is not to be linked, then the method 600 concludes after the decision operation 620.

Note that the method 600 may include other details that are not discussed in this method overview. Other details are discussed with reference to the appropriate figures and may be a part of the method 600, depending on the embodiment.

IV

Searching Metadata by Using an Internal Identifier Stored in Metadata

The system may use an internal identifier to facilitate searching of metadata. Links between an external identifier and the corresponding internal identifier further facilitate the searching processes.

Figure 7:
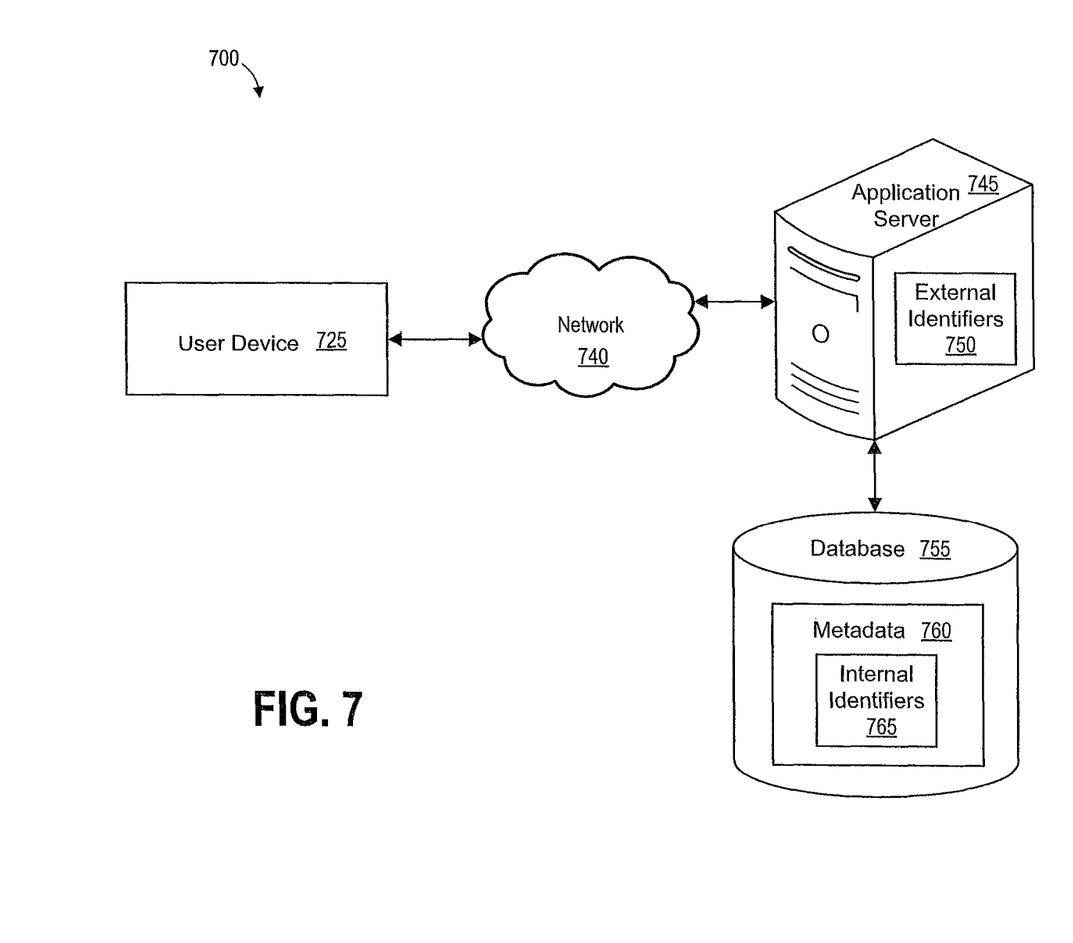
FIG. 7 is a block diagram of a system for searching metadata for occurrences of recordings, in accordance with some embodiments.

FIG. 7 is a block diagram of a system 700 for searching metadata for occurrences of recordings, in accordance with some embodiments. One or more external identifiers 750 are located in the application server 745. The application server is coupled to a database 755. The application server 745 is configured to search, organize and/or analyze the database 755. The database 755 includes metadata 760 for one or more occurrences of one or more recordings. The metadata includes one or more internal identifiers 765. Links between the external identifiers 750 and the internal identifiers 765 allow the application server 745 to search, organize and/or analyze the metadata in the database 755 in an efficient manner.

A network 740 couples the application server 745 and a user device 725. The system 700 includes one user device 725 for explanatory purposes. However, the network 740 may also be coupled to one or more other user devices, as described above with reference to FIG. 1. The user device 725 may be, for example, a laptop computer, a standalone disc player, an mp3 player or a cell phone, among other things.

Some or all software and data necessary for searching and managing metadata may be stored on the application server 745 and/or the user device 725. For example, the user device 725 may contain a subset or a complete set of the information available in the database 755 that is coupled to the application server 745. The user device 725 may be loaded with data from a CD-ROM (not shown). The user device 725 may store data on a hard disk of the user device. Alternatively, the user device 725 may download data to the user device 725 from the database 755 via the network 740. Other configurations exist as well.

The application server 745 is configured for searching data in the database 755. For example, the application server 745 may be configured for searching metadata related to occurrences of a recording. The metadata may be organized according to internal identifiers stored in the metadata. Other examples of data exist as well. U.S. patent application Ser. No. 11/716,269 (the '269 patent Application), entitled "Method and System for Media Navigation", is hereby incorporated by reference. The '269 patent Application provides an example of a method for navigating and searching through media on a database.

An identifier may also be referred to as a signature. The identifiers (e.g., signatures) may be arranged in clusters as described in the U.S. patent application Ser. No. 12/456,194, by Jens Nicholas Wessling, entitled "Generating a Representation of a Cluster of Signatures by Using Weighted Sampling", which is filed concurrently with the present patent application and is herein incorporated by reference. During a search, identifying (e.g., recognizing) a cluster may occur more efficiently by searching representations of clusters, instead of the identifiers (e.g., signatures) within the clusters.

Identifying an item may involve preliminary operations of generating an internal identifier for the item and storing the internal identifier in metadata, as discussed above with reference to other figures. For example, identifying a song may involve generating an audio fingerprint of the song. U.S. patent application Ser. Nos. 12/378,841 and 12/378,840, entitled "Recognizing a Disc", which are hereby incorporated by reference, provide examples of methods for identifying (e.g., recognizing) a disc, among other items.

The user device 725 may access the database 755 via the network 740. For example, the user may insert a disc while the user device 725 is coupled to the network 740. The disc may be, for example, a Blu-ray Disc. The user device 725 may send to the application 745 a query for particular metadata. The application server 745 may then provide the relevant metadata by accessing the database 755 according to the appropriate external identifier 750 and internal identifier 765. The user device 725 may also retrieve the relevant metadata from the database 755 upon receiving a user's manual request.

Alternatively, the user device 725 may perform a more comprehensive download of metadata from the database 755 to the user device 725. While the user device 725 is offline, the user device 725 may then provide relevant data according to a recognized internal identifier in the user device 725. For example, the user may insert a disc while the user device 725 is offline from the network 740. The disc may be, for example, a Blu-ray Disc. The user device 725 may then provide the relevant metadata by locating the appropriate internal identifier in the user device 725. The user device 725 may also retrieve the relevant metadata from the user device 725 upon receiving a user's manual request.

V

Computer Readable Medium Implementation

Figure 8:
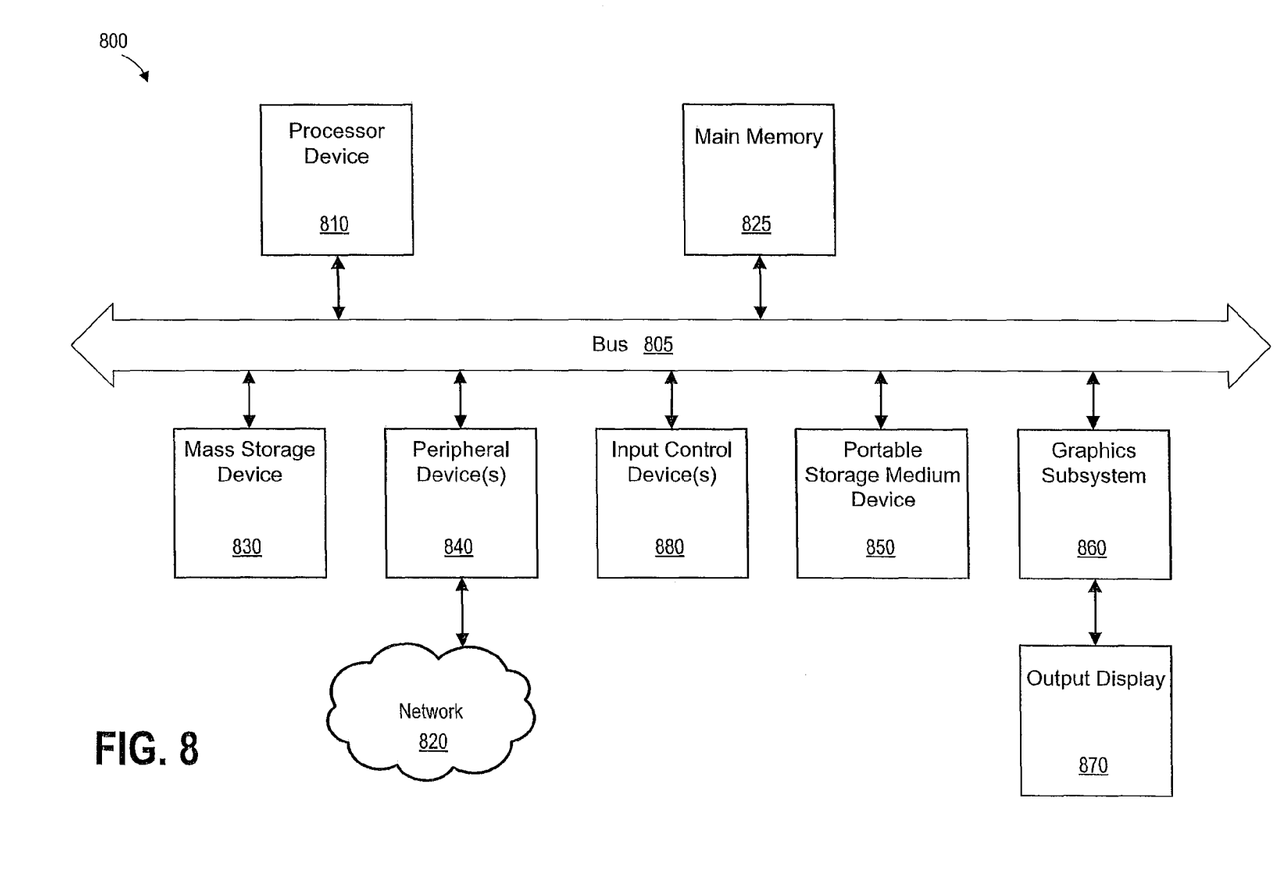
FIG. 8 is a high-level block diagram of a general/special purpose computer system, in accordance with some embodiments.

FIG. 8 is a high-level block diagram of a general/special purpose computer system 800, in accordance with some embodiments. The computer system 800 may be, for example, a user device, a user computer, a client computer and/or a server computer, among other things. Examples of a user device include without limitation a Blu-ray Disc player, a personal media device, a portable media player, an iPod®, a Zoom Player, a laptop computer, a palmtop computer, a smart phone, a cell phone, a mobile phone, an mp3 player, a digital audio recorder, a digital video recorder, a CD player, a DVD player, an IBM-type personal computer (PC) having an operating system such as Microsoft Windows®, an Apples computer having an operating system such as MAC-OS, hardware having a JAVA-OS operating system, and a Sun Microsystems Workstation having a UNIX operating system.

The computer system 800 preferably includes without limitation a processor device 810, a main memory 825, and an interconnect bus 805. The processor device 810 may include without limitation a single microprocessor, or may include a plurality of microprocessors for configuring the computer system 800 as a multi processor system. The main memory 825 stores, among other things, instructions and/or data for execution by the processor device 810. If the system for storing an internal identifier in metadata is partially implemented in software, the main memory 825 stores the executable code when in operation. The main memory 825 may include banks of dynamic random access memory (DRAM), as well as cache memory.

The computer system 800 may further include a mass storage device 830, peripheral device(s) 840, portable storage medium device(s) 850, input control device(s) 880, a graphics subsystem 860, and/or an output display 870. For explanatory purposes, all components in the computer system 800 are shown in FIG. 8 as being coupled via the bus 805. However, the computer system 800 is not so limited. Devices of the computer system 800 may be coupled through one or more data transport means. For example, the processor device 810 and/or the main memory 825 may be coupled via a local microprocessor bus. The mass storage device 830, peripheral device(s) 840, portable storage medium device(s) 850, and/or graphics subsystem 860 may be coupled via one or more input/output (I/O) buses. The mass storage device 840 is preferably a nonvolatile storage device for storing data and/or instructions for use by the processor device 810. The mass storage device 830, which may be implemented, for example, with a magnetic disk drive or an optical disk drive. In a software embodiment, the mass storage device 830 is preferably configured for loading contents of the mass storage device 830 into the main memory 825.

The portable storage medium device 850 operates in conjunction with a nonvolatile portable storage medium, such as, for example, a compact disc read only memory (CD ROM), to input and output data and code to and from the computer system 800. In some embodiments, the software for storing an internal identifier in metadata may be stored on a portable storage medium, and may be inputted into the computer system 800 via the portable storage medium device 850. The peripheral device(s) 840 may include any type of computer support device, such as, for example, an input/output (I/O) interface configured to add additional functionality to the computer system 800. For example, the peripheral device(s) 840 may include a network interface card for interfacing the computer system 800 with a network 820.

The input control device(s) 880 provide a portion of the user interface for a user of the computer system 800. The input control device(s) 880 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 800 preferably includes the graphics subsystem 860 and the output display 870. The output display 870 may include a cathode ray tube (CRT) display and/or a liquid crystal display (LCD). The graphics subsystem 860 receives textual and graphical information, and processes the information for output to the output display 870.

Each component of the computer system 800 may represent a broad category of a computer component of a general/special purpose computer. Components of the computer system 800 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure. Some embodiments may also be implemented by the preparation of application-specific integrated circuits or by interconnecting an appropriate network of conventional component circuits.

Some embodiments include a computer program product. The computer program product may be a storage medium/media having instructions stored thereon/therein which can be used to control, or cause, a computer to perform any of the processes of the invention. The storage medium may include without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of device suitable for storing instructions and/or data.

Stored on any one of the computer readable medium/media, some implementations include software for controlling both the hardware of the general/special computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming/software of the general/special purpose computer or microprocessor are software modules for implementing the processes described above. The processes described above may include without limitation the following: receiving a recording, generating an internal identifier for the recording, and adding the internal identifier to metadata associated with at least one occurrence of the recording.

ADVANTAGES

The system described above is configured for managing metadata for occurrences of a recording. A first aspect of the system involves storing a unique internal identifier in metadata for occurrences of a recording. Such addition of unique internal identifiers allows for efficiently searching, efficiently organizing and efficiently analyzing metadata associated with recordings in a user's collection. A second aspect of the system involves linking the internal identifier to an external identifier that is not in the metadata. Linking the internal identifier to the external identifier allows the metadata to be searched, located and/or organized in an even more efficient manner.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving a recording, wherein the recording includes computer readable media data;
   generating, by use of one or more processors, an internal identifier for the recording, wherein the internal identifier is a signature that uniquely identities the recording;
   adding the internal identifier to a plurality of internal identifier fields of a plurality of structures for metadata, wherein the plurality of structures includes metadata associated with a plurality of different occurrences of the recording, wherein the metadata included in the structures is data that describes the computer readable media data included in each of the plurality of different occurrences of the recording, and wherein each of the plurality of structures is stored in a database, and
   generating, by use of the one or more processors, a link between the internal identifier in the metadata of each of the plurality of different occurrences of the recording and an external identifier not in the metadata, wherein the external identifier is derived from audio or video data of the recording.

2. The method of claim 1, wherein adding the internal identifier comprises:
   adding the internal identifier to an internal identifier field of a structure for first metadata associated with a first occurrence of the recording; and
   adding the internal identifier to an internal identifier field of a structure for second metadata associated with a second occurrence of the recording, wherein the metadata associated with the first occurrence of the recording is different than the metadata associated with the second occurrence of the recording.

3. The method of claim 1, wherein the metadata included in the structures includes at least one of:
   a track title, wherein the track title is different from another track title in other metadata associated with another occurrence of the recording;
   an album title, wherein the album title is different from another album title in other metadata associated with another occurrence of the recording;
   a track date, wherein the track date is different from another track date in other metadata associated with another occurrence of the recording;
   a genre, wherein the genre is different from another genre in other metadata associated with another occurrence of the recording artist information, wherein the artist information is different from another artist information in other metadata associated with another occurrence of the recording; and
   album information, wherein the album information is different from another album information in other metadata associated with another occurrence of the recording.

4. The method of claim 1, wherein the recording includes at least one of:
   an audio track;
   a video track;
   a song;
   a chapter;
   a CD recording;
   DVD recording; and
   a Blu-ray Disc recording.

5. The method of claim 1, further comprising generating the internal identifier by using at least one of:
   an audio fingerprint of the recording;
   a portion of an audio fingerprint of the recording;
   an identifier derived from an audio fingerprint of the recording;
   an audio identifier of the recording;
   a video identifier of the recording;
   a disc identifier;
   a compact disc identifier;
   a digital video disc identifier;
   Blu-ray Disc identifier;
   a media identifier; and
   a high definition media identifier.

6. The method of claim 1, wherein the metadata is associated with the recording after the recording is ripped from a computer readable medium.

7. The method of claim 6, wherein the computer readable medium is at least one of:
   a disc;
   an optical disc;
   a compact disc;
   a digital video disc; and
   a Blu-ray Disc.

8. The method of claim 1, wherein the metadata included in the structures includes at least one of:
   a track name;
   a song name;
   artist information;
   album information;
   relational information; and
   supplemental information.

9. The method of claim 1, wherein the recording is stored separately from the database that stores each of the plurality of structures.

10. The method of claim 1, wherein the recording is stored in a user device, and each of the plurality or structures are stored in a device external to the user device.

11. A system including at least one processor for storing an internal identifier in metadata, wherein the system is configured for:
  receiving a recording, wherein the recording includes computer readable media data;
  generating an internal identifier for the recording, wherein the internal identifier is a signature that uniquely identifies the recording;
  adding the internal identifier to a plurality of internal identifier fields of a plurality of structures for metadata, wherein the plurality of structures includes metadata associated with a plurality of different occurrences of the recording, wherein the metadata included in the structures is data that describes the computer readable media data included in each of the plurality of different occurrences of the recording, and wherein each of the plurality of structures is stored in a database, and
  generating, by use of the one or more processors, a link between the internal identifier in the metadata of each of the plurality of different occurrences of the recording and an external identifier not in the metadata, wherein the external identifier is derived from audio or video data of the recording.

12. The system of claim 11, wherein adding the internal identifier comprises:
  adding the internal identifier to an internal identifier field of a structure for first metadata associated with a first occurrence of the recording; and
  adding the internal identifier to an internal identifier field of a structure for second metadata associated with a second occurrence of the recording, wherein the metadata associated with the first occurrence of the recording is different than the metadata associated with the second occurrence of the recording.

13. The system of claim 11, wherein the metadata included in the structures includes at least one of:
  a track title, wherein the track title is different from another track title in other metadata associated with another occurrence of the recording;
  an album title, wherein the album title is different from another album title in other metadata associated with another occurrence of the recording;
  a track date, wherein the track date is different from another track date in other metadata associated with another occurrence of the recording;
  a genre, wherein the genre is different from another genre in other metadata associated with another occurrence of the recording;
  artist information, wherein the artist information is different from another artist information in other metadata associated with another occurrence of the recording; and
  album information, wherein the album information is different from another album information in other metadata associated with another occurrence of the recording.

14. The system of claim 11, wherein the recording includes at least one of:
  an audio track;
  a video track;
  a song;
  a chapter;
  a CD recording;
  a DVD recording; and
  a Blu-ray Disc recording.

15. The system of claim 11, wherein the system is further configured for generating an internal identifier by using at least one of:
  an audio fingerprint of the recording;
  a portion of an audio fingerprint of the recording;
  an identifier derived from an audio fingerprint of the recording;
  an audio identifier of the recording;
  a video identifier of the recording;
  a disc identifier;
  a compact disc identifier;
  a digital video disc identifier;
  a Blu-ray Disc identifier;
  a media identifier; and
  a high definition media identifier.

16. The system of claim 11, wherein the metadata is associated with the recording after the recording is ripped from a computer readable medium.

17. The system of claim 16, wherein the computer readable medium is at least one of:
  a disc;
  an optical disc;
  a compact disc;
  a digital video disc; and
  a Blu-ray Disc.

18. The system of claim 11, wherein the metadata included in the structures includes at least one of:
  a track name;
  a song name;
  artist information;
  album information;
  relational information; and
  supplemental information.

19. A non-transitory computer readable medium carrying one or more instructions for storing an internal identifier in metadata, wherein the one or more instructions, when executed by one or more processors, cause the one or more processors to perform the steps of:
  receiving a recording, wherein the recording includes computer readable media data;
  generating an internal identifier for the recording, wherein the internal identifier is a signature that uniquely identifies the recording;
  adding the internal identifier to a plurality of internal identifier fields of a plurality of structures for metadata, wherein the plurality of structures includes metadata associated with a plurality of different occurrences of the recording, wherein the metadata included in the structures is data that describes the computer readable media data included in each of the plurality of different occurrences of the recording, and wherein each of the plurality of structures is stored in a database, and
  generating, by use of the one or more processors, a link between the internal identifier in the metadata of each of the plurality of different occurrences of the recording and an external identifier not in the metadata, wherein the external identifier is derived from audio or video data of the recording.

* * * * *